(No Model.)
W. G. PRESCOTT.
VALVE.
No. 559,908. Patented May 12, 1896.
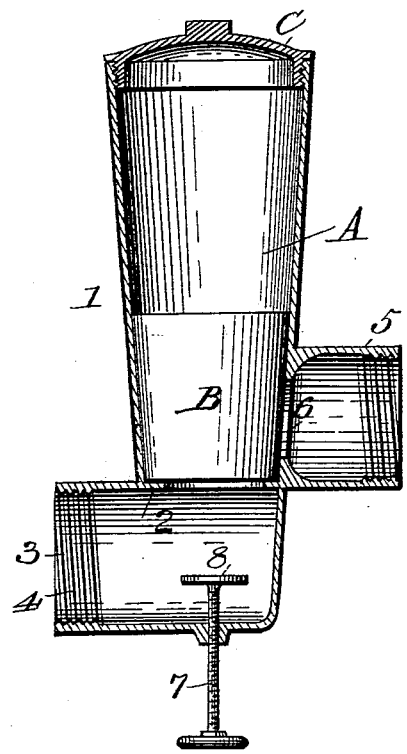
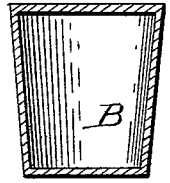
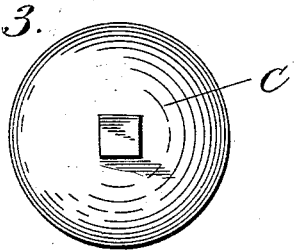
Witnesses
F. L. Ourand
J. S. Sint
Inventor
Wm G. Prescott
By H. B. Willsey
Attorney

UNITED STATES PATENT OFFICE.

WILLIAM G. PRESCOTT, OF FINDLAY, OHIO.

VALVE.

SPECIFICATION forming part of Letters Patent No. 559,908, dated May 12, 1896.

Application filed January 21, 1896. Serial No. 576,314. (No model.)

*To all whom it may concern:*

Be it known that I, WILLIAM G. PRESCOTT, a citizen of the United States, residing at Findlay, in the county of Hancock and State of Ohio, have invented certain new and useful Improvements in Valves; and I do declare the following to be a full, clear, and exact description of the invention, such as will enable others skilled in the art to which it appertains to make and use the same.

My invention has relation to improvements in valves especially adapted for connection to and use in oil-tanks; and the object is to provide an automatically-seating valve intended for interposition in the discharge-pipe of the tank and adjacent thereto, whereby when the oil is drawn down in the tank to the gravity-line the valve will close the pipe and prevent the ingress of air to the tank to interpose with the subsequent rise of oil in the tank.

I have fully and clearly illustrated my invention in the accompanying drawings, wherein—

Figure 1 is a vertical sectional view of the valve-shell and pipe-joint. Fig. 2 is a vertical section of the float-valve. Fig. 3 is a detail of the closing-cap.

A designates the shell of the valve, consisting of a circular stem 1, tapering from top to base, substantially as shown, and formed with an interior annular flange 2 at its base, on which the float-valve closes down and seats. The body of the shell 1 is formed with an inlet branch or piece 3, having screw-threads 4 to make connection with the inlet-pipe leading from the tank, and also formed with an outlet or discharge piece or pipe 5, opening from the stem 1, as shown, the lower line of this pipe being substantially on a line with the upper line of the inlet-pipe piece. The outlet port or orifice is preferably made smaller than the pipe, as shown, which is effected by an annular interior flange 6, the inner face of which is in alinement with the inner face of the stem 1 and inclines with the taper-line thereof, as shown in the drawings.

B designates the float-valve, made of any suitable material, and consisting of a hollow tapering or conical shell with closed top and bottom and adapted to fit in the tapering stem and to sit down on the base-flange 2 and close the port to the discharge-pipe when the oil is drawn down in the tank to the gravity-line and to be carried by the oil when flowing through the shell.

On the top of the stem 1 is fitted a screw-cap C, which closes the stem and prevents the escape of oil when the valve is raised and the oil is passing through the shell or body.

To lift the float-valve from its seat in the stem, a threaded rod 7 is let through the shell and provided with a cross-piece or disk 8 on the upper end, as shown in the drawings. By screwing up the rod 7 against the bottom of the valve the valve may be loosened from its seat, when the force of the oil will carry it farther upward, where it will remain until the oil-pressure is overcome by its weight, when it will again drop down onto the seat. After the valve has been lifted, as specified, the threaded rod is screwed back to normal position, being substantially that shown in the drawings.

Having thus described my invention, what I claim, and desire to secure by Letters Patent, is—

1. A valve for stopping the ingress of air to an oil-tank, comprising a shell or body formed with an inlet-pipe, a conically-tapering stem opening into the inlet-pipe and formed with an interior annular flange at its base, and a discharge-pipe opening adjacent to the base of the stem, a tapering float-valve in the stem adapted to move down therein by gravity and close the outlet-port in the stem, and a cover detachably secured on the stem, substantially as described.

2. A valve for stopping the ingress of air to an oil-tank, comprising a shell or body formed with an inlet-pipe, a conically-tapering stem opening into the inlet-pipe and formed with an interior annular flange at its base, and a discharge-pipe leading from the base thereof and provided with an interior annular flange contiguous to the discharge-port of smaller diameter than the discharge-pipe, a tapering float-valve in the stem adapted to move down therein by gravity and close the outlet-port in the stem, a vertically-adjustable screw let through the bottom of the shell, and having a disk on its upper end to push the valve from its seat, and a cover secured on the tapering stem, substantially as and for the purpose specified.

In testimony whereof I hereunto affix my signature in presence of two witnesses.

WILLIAM G. PRESCOTT.

Witnesses:
 ALBERT H. COURTNEY,
 ERNEST D. NICKERSON.